(12) United States Patent
Lee et al.

(10) Patent No.: US 9,207,494 B2
(45) Date of Patent: Dec. 8, 2015

(54) DISPLAY DEVICE AND METHOD OF MANUFACTURING THE SAME

(71) Applicant: SAMSUNG DISPLAY CO., LTD., Yongin, Gyeonggi-Do (KR)

(72) Inventors: Sang-Myoung Lee, Seoul (KR); Suwan Woo, Osan-Si (KR); Jang-Il Kim, Bucheon-Si (KR); Swae-Hyun Kim, Asan-Si (KR); Jae Hwa Park, Gumi-Si (KR); Je Hyeong Park, Hwaseong-Si (KR); Younggoo Song, Asan-Si (KR); Hyunggi Jung, Cheonan-Si (KR); Kipyo Hong, Suwon-Si (KR); Sang Woo Whangbo, Seoul (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 144 days.

(21) Appl. No.: 13/944,544

(22) Filed: Jul. 17, 2013

(65) Prior Publication Data

US 2014/0285754 A1 Sep. 25, 2014

(30) Foreign Application Priority Data

Mar. 22, 2013 (KR) .......................... 10-2013-0031091

(51) Int. Cl.
*G02F 1/1333* (2006.01)
*G02F 1/1337* (2006.01)
*G02F 1/1339* (2006.01)

(52) U.S. Cl.
CPC ........ *G02F 1/1337* (2013.01); *G02F 1/133711* (2013.01); *G02F 1/133788* (2013.01); *G02F 2001/133388* (2013.01)

(58) Field of Classification Search
CPC .... G02F 1/1337; G02F 1/133707; G02F 1/1339
USPC .................................. 349/123, 153, 158, 160
See application file for complete search history.

(56) References Cited

U.S. PATENT DOCUMENTS 6,194,284 B1 2/2001 Chen
7,102,723 B2 9/2006 Byun et al.
(Continued)

FOREIGN PATENT DOCUMENTS

CN 102402070 4/2012
CN 102402071 4/2012
(Continued)

OTHER PUBLICATIONS

English Abstract for Publication No. 09-260381.
(Continued)

*Primary Examiner* — Nathanael R Briggs
(74) *Attorney, Agent, or Firm* — F. Chau & Associates, LLC

(57) ABSTRACT

A display device includes a display area and a non-display area, a first alignment layer disposed on a first substrate, a second alignment layer disposed on a second substrate, a liquid crystal layer disposed between the first alignment layer and the second alignment layer; and a groove disposed in the non-display area of the second substrate to correspond to at least a portion of an end portion of the second alignment layer. The groove is provided along at least one side of the display area and is configured to be filled by an alignment solution used to from the second alignment layer and prevent the alignment solution from dispersing to other areas of the second substrate.

23 Claims, 15 Drawing Sheets

(56) References Cited

U.S. PATENT DOCUMENTS

| | | |
|---|---|---|
| 7,667,813 B2 | 2/2010 | Kim et al. |
| 7,961,282 B2 | 6/2011 | Iwato et al. |
| 8,174,663 B2 | 5/2012 | Lee et al. |
| 2005/0078247 A1* | 4/2005 | Tsuchiya ............... 349/123 |
| 2005/0117093 A1* | 6/2005 | Kim et al. ............... 349/106 |
| 2006/0113284 A1 | 6/2006 | Umetsu |
| 2007/0030436 A1* | 2/2007 | Sasabayashi ........... 349/153 |
| 2008/0018848 A1 | 1/2008 | Iwato et al. |
| 2011/0255041 A1* | 10/2011 | Inoue ..................... 349/123 |

FOREIGN PATENT DOCUMENTS

| | | |
|---|---|---|
| CN | 102854669 | 1/2013 |
| JP | 09-260381 | 10/1997 |
| JP | 2007-248898 | 9/2007 |
| JP | 2009-237444 | 10/2009 |
| JP | 2010-170038 | 8/2010 |
| KR | 10-2007-0010847 | 1/2007 |
| KR | 10-1165084 | 7/2012 |

OTHER PUBLICATIONS

English Abstract for Publication No. 10-2007-0010847.
English Abstract for Publication No. 2007-248898.
English Abstract for Publication No. 2009-237444.
English Abstract for Publication No. 2010-170038.
English Abstract for Publication No. 10-1165084.

* cited by examiner

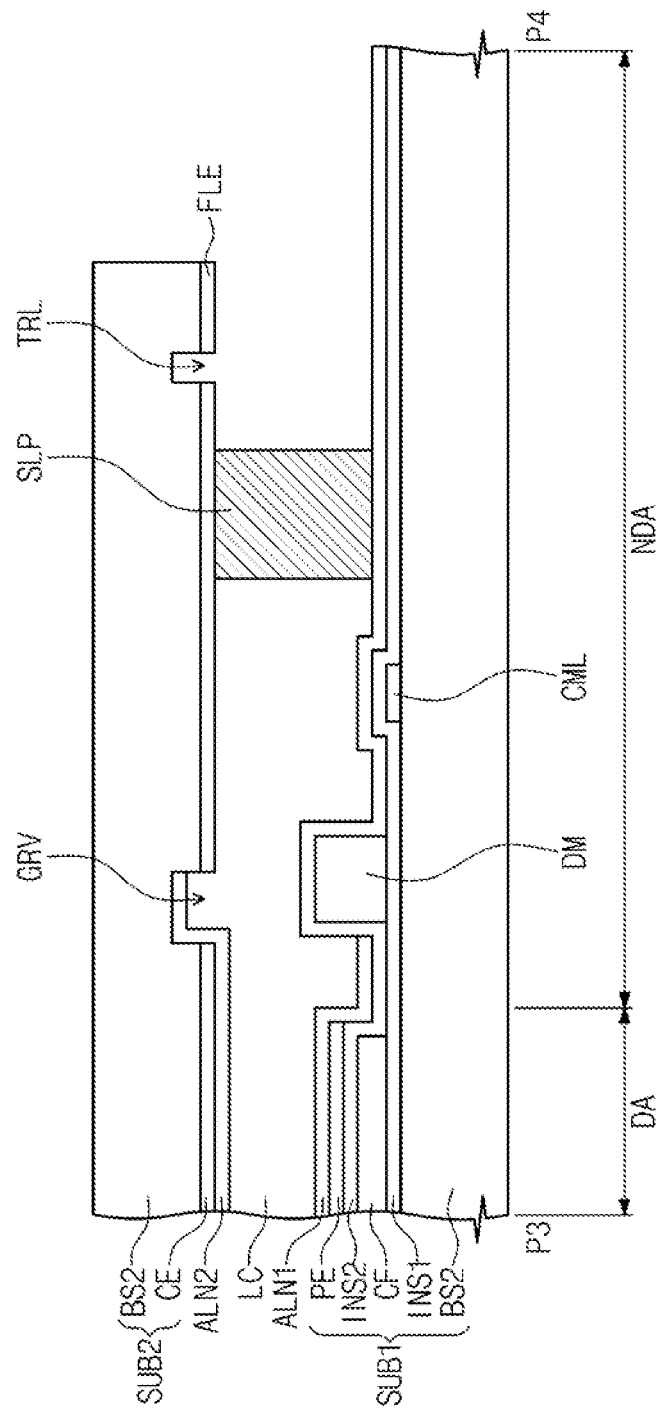

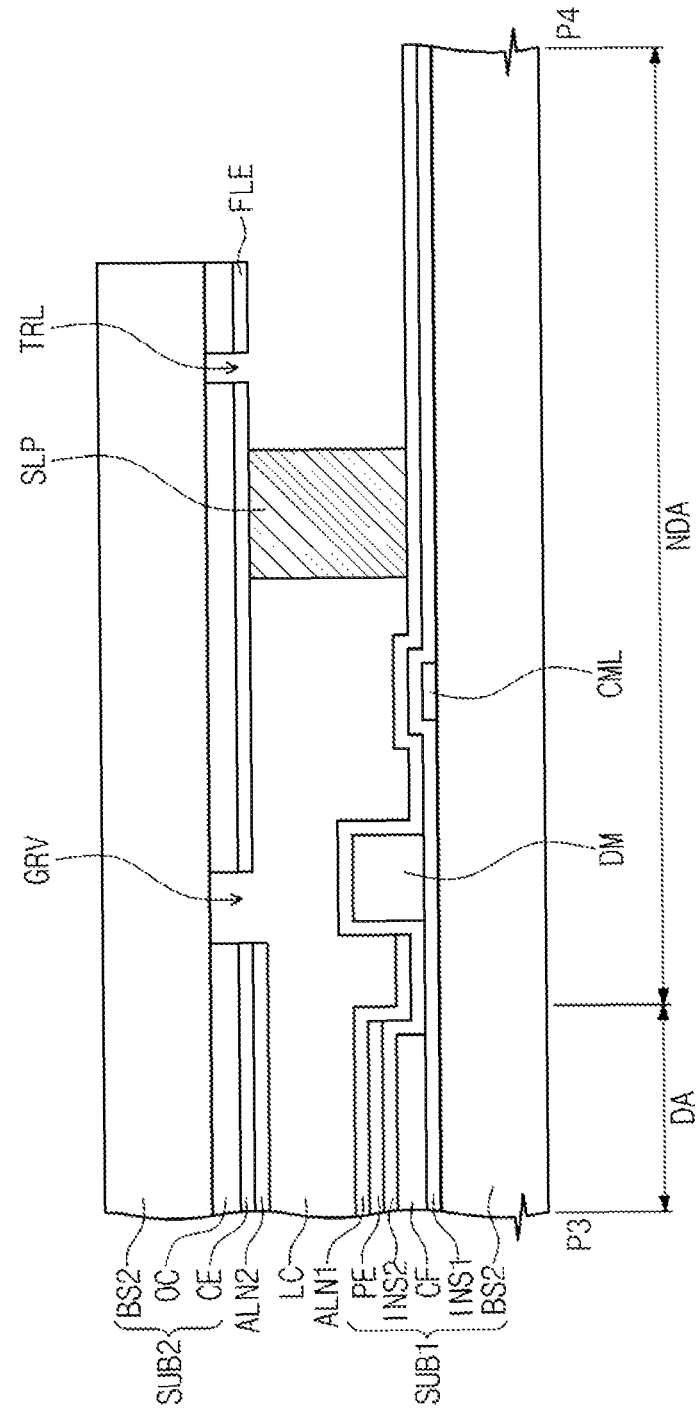

DISPLAY DEVICE AND METHOD OF MANUFACTURING THE SAME

CROSS-REFERENCE TO RELATED APPLICATION

This U.S. non-provisional patent application claims priority under 35 U.S.C. §119 from Korean Patent Application No. 10-2013-0031091, filed on Mar. 22, 2013 in the Korean Intellectual Property Office, and all the benefits accruing therefrom, the contents of which are herein incorporated by reference in their entirety.

BACKGROUND

1. Technical Field

Embodiments of the present disclosure are directed to a display device and a method of manufacturing the same. More particularly, embodiments of the present disclosure are directed to a display device with improved display quality and a method of manufacturing the display device.

2. Discussion of the Related Art

In general, a liquid crystal display includes two transparent substrates and a liquid crystal layer interposed between the two substrates. A liquid crystal display drives liquid crystal molecules of the liquid crystal layer to control the transmittance of light passing through each pixel, to display a desired image.

A liquid crystal display includes an alignment layer to initially align liquid crystal molecules of the liquid crystal layer. The alignment layer is disposed on a surface of each substrate. When the alignment layer is overcoated or insufficiently coated on the surface of the substrates, the two substrates do not appropriately adhere to each other and stains may occur on the images.

SUMMARY

Embodiments of the present disclosure provide a display panel that can prevent alignment defects from occurring.

Embodiments of the present disclosure provide a method of manufacturing the display panel.

Embodiments of the inventive concept provide a display device that includes a display area and a non-display area, a first alignment layer disposed on a first substrate, a second alignment layer disposed on a second substrate, a liquid crystal layer disposed between the first alignment layer and the second alignment layer, and a groove disposed in the non-display area of the second substrate to correspond to at least a portion of an end portion of the second alignment layer. The groove is configured to be filled by an alignment solution used to from the second alignment layer and prevent the alignment solution from dispersing to other areas of the second substrate.

The first substrate includes a first base substrate and a pixel electrode disposed on the first base substrate, and the second substrate includes a second base substrate and a common electrode disposed on the second base substrate. The groove is disposed in the second base substrate.

The display device may further include an overcoat layer disposed between the second base substrate and the common electrode, and the groove is disposed in the overcoat layer.

The groove is provided along at least one side of the display area.

A plurality of spaced apart grooves may be provided.

The display device may further include a barrier dam disposed in the non-display area of the first substrate that protrudes from the first substrate in an area corresponding to an end portion of the first alignment layer; color filters disposed between the first base substrate and the pixel electrode; and a black matrix disposed on the first substrate between the color filters. The barrier dam is formed of the same material as the black matrix.

Embodiments of the inventive concept provide a method of manufacturing a display device that includes a display area that displays an image and a non-display area disposed adjacent to at least a side of the display area. The method includes manufacturing a first substrate, forming a first alignment layer on the first substrate, manufacturing a second substrate that includes a common electrode and a groove disposed in the non-display area, and forming a second alignment layer on the second substrate. The groove is formed on the second substrate using a laser beam.

At least one of a width or a depth of the groove is controlled by at least one of an energy intensity or a focusing depth of the laser beam.

The method further includes forming a trimming line and an alignment key pattern in the non-display area of the second substrate using the laser beam. The alignment key pattern is configured to align the first substrate and the second substrate, and the trimming line separates a floating electrode from the common electrode.

The method further includes removing the trimming line and the alignment key pattern using the laser beam when the groove is formed.

The trimming line, the groove, and the alignment key pattern are formed in a single process step.

The method further includes forming a liquid crystal layer between the first substrate and the second substrate.

Embodiments of the inventive concept provide a display device that includes a display area and a non-display area; a first alignment layer disposed on a first substrate; a second alignment layer disposed on a second substrate; a liquid crystal layer disposed between the first alignment layer and the second alignment layer; a groove disposed in the non-display area of the second substrate to correspond to at least a portion of an end portion of the second alignment layer; and a barrier dam disposed in the non-display area of the first substrate that protrudes from the first substrate in an area corresponding to an end portion of the first alignment layer.

The second substrate further includes a common electrode; a trimming line disposed in the non-display area thereof that separates a floating electrode from the common electrode; and an alignment key pattern disposed in the non-display area thereof. The alignment key pattern is configured to prevent misalignment between the first substrate and the second substrate when the first substrate and the second substrate are attached to each other.

According to the above, defects caused by the alignment layers and a sealant part may be prevented from occurring on the display device. In addition, the manufacturing process of the display panel may be simplified.

BRIEF DESCRIPTION OF THE DRAWINGS

FIG. 6 is a cross-sectional view taken along a line P3-P4 of FIG. 1.

FIG. 13 is a cross-sectional view of a display panel according to another exemplary embodiment of the present disclosure, which is taken along the lint P3-P4 of FIG. 1.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers refer to like elements throughout.

Hereinafter, exemplary embodiments of the present disclosure will be explained in detail with reference to the accompanying drawings.

Figure 1:
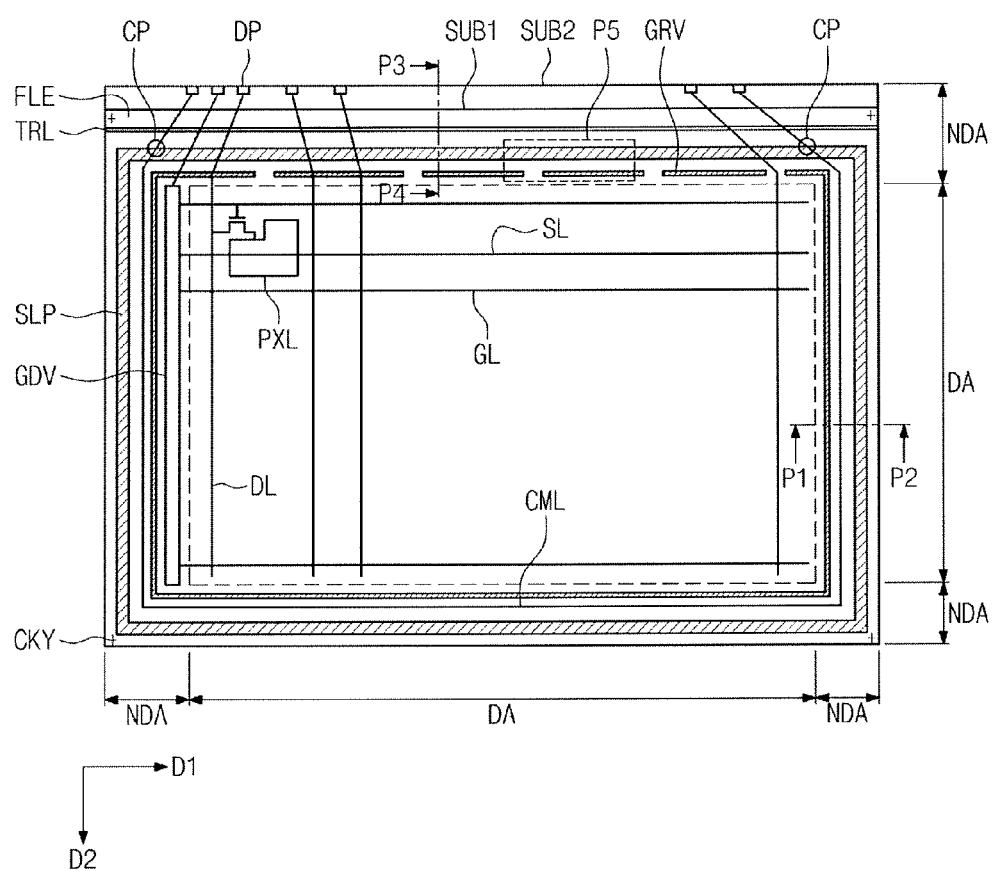
FIG. 1 is a plan view of a display device according to an exemplary embodiment of the present disclosure.
Figure 2:
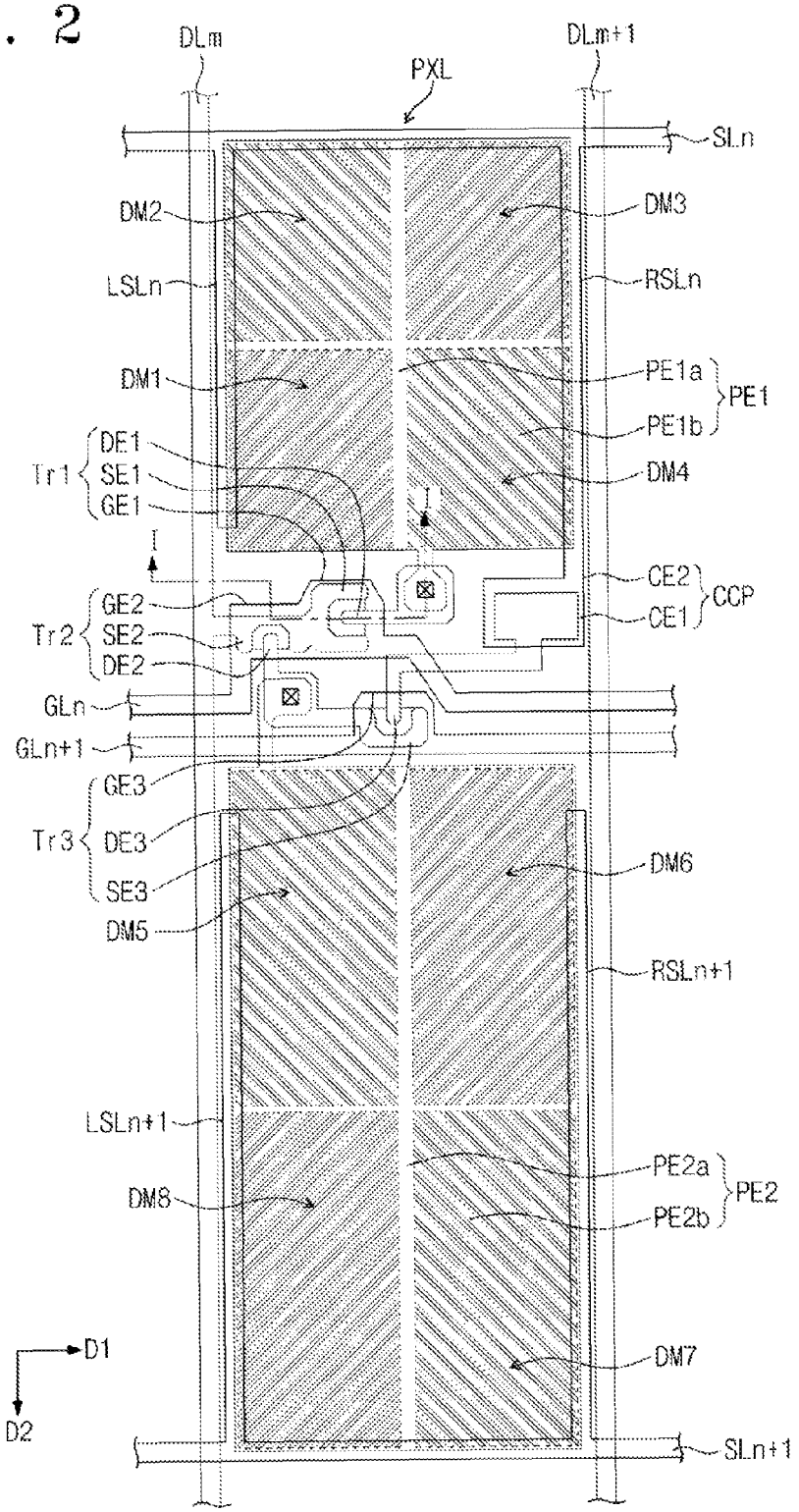
FIG. 2 is a plan view of one pixel of the display device shown in FIG. 1.
Figure 3:
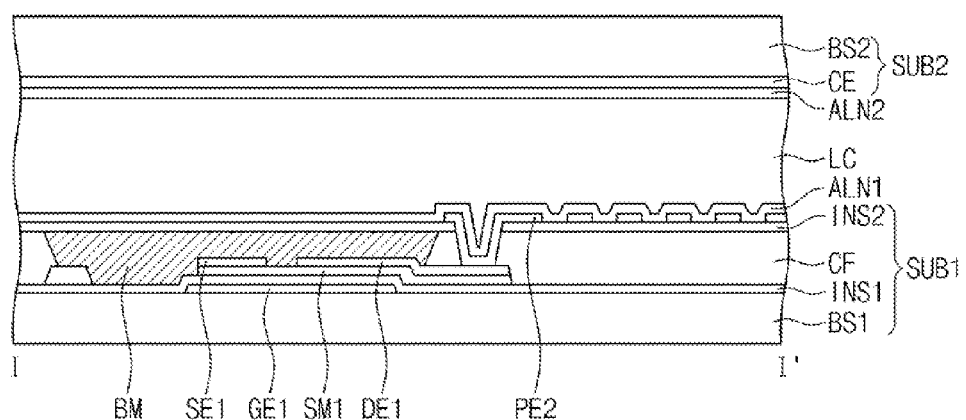
FIG. 3 is a cross-sectional view taken along a line I-I' of FIG. 2.
Figure 4:
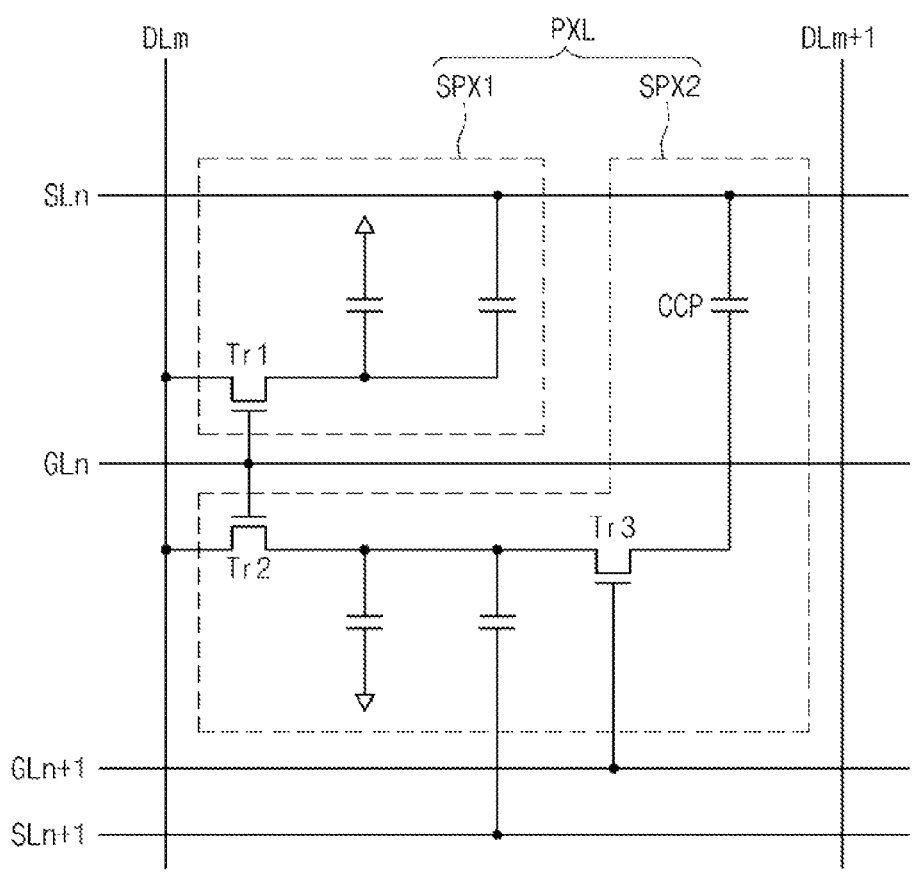
FIG. 4 is an equivalent circuit diagram of the pixel shown in FIG. 2.

FIG. 1 is a plan view of a display device according to an exemplary embodiment of the present disclosure, FIG. 2 is a plan view of one pixel of the display device shown in FIG. 1, FIG. 3 is a cross-sectional view taken along a line of FIG. 2, and FIG. 4 is an equivalent circuit diagram of the pixel shown in FIG. 2.

Referring to FIGS. 1 to 4, a display device has a rectangular shape with a pair of long sides and a pair of short sides. The display device includes a display area DA that includes a plurality of pixels PXL to display an image and a non-display area NDA that surrounds the display area DA.

The display device includes a first substrate SUB1, a first alignment layer ALN1 disposed on the first substrate SUB1, a second substrate SUB2 that faces the first substrate SUB1, a second alignment layer ALN2 disposed on the second substrate SUB2, and a liquid crystal layer LC disposed between the first substrate SUB1 and the second substrate SUB2.

In a present exemplary embodiment, a substrate upon which thin film transistors are disposed may be referred to as the first substrate SUB1 and a substrate that faces the first substrate SUB1 may be referred to as the second substrate SUB2, but these reference names are exemplary and non-limiting.

The first substrate SUB1 includes a first base substrate BS1, a line part disposed on the first base substrate BS1, and the pixels PXL connected to the line part.

The first base substrate BS1 may be a transparent insulating substrate. The first base substrate BS1 may be formed of various materials, e.g., glass, plastic, silicon, crystal, etc.

The line part includes a plurality of gate lines GL, a plurality of data lines DL, a plurality of storage lines SL, and a common line CML, and the gate lines GL are connected to a gate driver GDV disposed in the non-display area NDA. Although not shown in figures, the storage lines SL are separately connected to a storage voltage source. An exemplary, non-limiting gate driver GDV is disposed on the first base substrate BS1 and includes thin film transistors formed from amorphous silicon. The data lines DL are connected to external lines through data pads DP, which are disposed in the non-display area NDA. The common line CML is electrically connected to a common electrode CE through a contact part CP disposed in the non-display area NDA. The contact part CP is formed by dotting a conductive material, e.g., silver. The contact part CP may be disposed in the non-display area NDA and overlaps the sealant part SLP, or may be disposed adjacent to the sealant part SLP.

Each pixels PXL has the same configuration and function, and thus for the convenience of explanation, one pixel PXL has been shown with a gate line GL and a data line DL, which are adjacent to the pixel PXL. In FIGS. 2 to 4, for the convenience of explanation, an n-th gate line GLn, an (n+1)th gate line GLn+1, an m-th data line DLm, and an (m+1)th data line DLm+1 have been shown with the pixel PXL. Hereinafter, the n-th and (n+1)th gate lines GLn and GLn+1 are respectively referred to as first and second gate lines, and the m-th and (m+1)th data lines DLm and DLm+1 are respectively referred to as first and second data lines.

The first and second gate lines GLn and GLn+1 are disposed on the first base substrate BS1 and extend in a first direction D1 substantially parallel to each other. The first and second data lines DLm and DLm+1 are disposed on the first base substrate BS1 and extend in a second direction D2 substantially perpendicular to the first direction D1 and substantially parallel to each other. A first insulating layer INS1 is disposed between the gate lines GLn and GLn+1 and the data lines DLm and DLm+1.

Each pixel PXL includes a first sub-pixel SPX1 and a second sub-pixel SPX2. The first sub-pixel SPX1 includes a first thin film transistor Tr1, a first sub-pixel electrode PE1, and a first storage electrode part, described in more detail below, and the second sub-pixel SPX2 includes a second thin film transistor Tr2, a second storage electrode part, described in more detail below, a third thin film transistor Tr3, a second sub-pixel electrode PE2, and a coupling capacitor CCP. The first and second sub-pixels SPX1 and SPX2 are disposed between the first data line DLm and the second data line DLm+1, which are adjacent to each other.

The first thin film transistor Tr1 of the first sub-pixel SPX1 is connected to the first data line DLm and the first gate line GLn.

The first thin film transistor Tr1 includes a first gate electrode GE1 branched from the first gate line GLn, a first source electrode SE1 branched from the first data line DLm, and a first drain electrode DE1 electrically connected to the first sub-pixel electrode PE1.

The first storage electrode part includes a first storage line SLn that extends in the first direction D1 and first and second branch electrodes LSLn and RSLn branched from the first storage line SLn that extends in the second direction D2.

The first sub-pixel electrode PE1 partially overlaps the first storage line SLn and the first and second branch electrodes LSLn and RSLn to form a first storage capacitor (not shown).

The first sub-pixel electrode PE1 includes a trunk portion PE1a and a plurality of branch portions PE1b that radially extend from the trunk portion PE1a.

The trunk portion PE1a may have a cross shape as shown in FIG. 2. In this case, the first sub-pixel electrode PE1 is divided into plural domains by the trunk portion PE1a. The branch portions PE1b extend in different directions according to the domains. In a present exemplary embodiment, the first sub-pixel electrode PE1 includes first, second, third, and fourth domains DM1, DM2, DM3, and DM4. The branch portions PE1b, which are adjacent to each other, extend substantially parallel to each other and are spaced apart from each other in each domain. The spacing between adjacent branch portions PE1b is on the order of a micrometer. Due to the above-mentioned structure, liquid crystal molecules of the liquid crystal layer LC may be aligned at a specific azimuth on a plane parallel to the first base substrate BS1.

The second thin film transistor Tr2 includes a second gate electrode GE2 branched from the first gate line GLn, a second source electrode SE2 branched from the first data line DLm, and a first drain electrode DE1 electrically connected to the second sub-pixel electrode PE2.

The second storage electrode part includes a second storage line SLn+1 that extends in the second direction D2 and third and fourth branch electrodes LSLn+1 and RSLn+1 branched from the second storage line SLn+1 that extend in the second direction D2.

The second sub-pixel electrode PE2 partially overlaps the second storage line SLn+1 and the third and fourth branch electrodes LSLn+1 and RSLn+1 to form a second storage capacitor (not shown).

The second sub-pixel electrode PE2 includes a trunk portion PE2a and a plurality of branch portions PE2b that radially extend from the trunk portion PE2a. The trunk portion PE2a may have the cross shape as shown in FIG. 2. In this case, the second sub-pixel electrode PE2 is divided into plural domains by the trunk portion PE2a. The branch portions PE2b extend in different directions according to the domains. In a present exemplary embodiment, the second sub-pixel electrode PE2 includes fifth, sixth, seventh, and eighth domains DM5, DM6, DM7, and DM8. The branch portions PE2b, which are adjacent to each other, extend substantially parallel to each other and are spaced apart from each other in each domain. The spacing between adjacent branch portions PE2b is of the order of a micrometer. Due to the above-mentioned structure, liquid crystal molecules of the liquid crystal layer LC may be aligned at a specific azimuth on a plane substantially parallel to the second substrate SUB2.

The third thin film transistor Tr3 includes a third gate electrode GE3 branched from the second gate line GLn+1, a third source electrode SE3 that extends from the second drain electrode DE2, and a third drain electrode DE3 connected to a coupling capacitor electrode CE1 that is part of the coupling capacitor CCP. An exemplary, non-limiting coupling capacitor CCP may be formed by the coupling capacitor electrode CE1 and an opposite electrode CE2 that extends from the second branch electrode RSLn.

The first and second sub-pixel electrodes PE1 and PE2 form a pixel electrode PE, which is formed of a transparent conductive material. In particular, the pixel electrode PE is formed of a transparent conductive oxide, e.g., indium tin oxide, indium zinc oxide, indium tin zinc oxide, etc.

Referring to FIGS. 1 and 3, the first substrate SUB1 includes the first insulating layer INS1, a second insulating layer INS2, color filters CF, and a black matrix BM. The color filters CF and the black matrix BM are disposed on the first insulating layer INS1. The color filters CF are disposed to respectively correspond to the pixels, and each color filter CF has a red R, green G, or blue B filter. The black matrix BM is disposed between the color filters CF to block light from passing through between the color filters CF. The black matrix BM covers the channel portion of the first, second, and third thin film transistors Tr1, Tr2, and Tr3. Although not shown in figures, a spacer formed of a same material as the black matrix BM may be further provided. The second insulating layer INS2 is disposed on the black matrix BM and the color filters CF.

The first alignment layer ALN1 is disposed on the first substrate SUB1. The first alignment layer ALN1 may include an organic polymer material or an inorganic polymer material, e.g., a polyimide, a polyamic acid, a polysiloxane, etc. The first alignment layer ALN1 initially aligns the liquid crystal molecules of the liquid crystal layer LC and includes a polymer material in which light, such ultraviolet (UV) light or a laser, initiates a decomposition, dimerization, or isomerization reaction. In addition, the first alignment layer ALN1 may include a polymer polymerized with reactive mesogens.

The second substrate SUB2 includes a second base substrate BS2, a common electrode CE, a floating electrode FLE, and the second alignment layer ALN2.

The second base substrate BS2 is an insulating substrate formed of glass, plastic, silicon, or crystal.

The common electrode CE is disposed on the second base substrate BS2. The common electrode CE covers the display area DA and a portion of the non-display area NDA. The common electrode CE forms an electric field in cooperation with the pixel electrode PE.

The floating electrode FLE is disposed on a portion of the non-display area in which the common electrode CE is not disposed.

A second alignment layer ALN2 is disposed on the common electrode CE. The second alignment layer ALN2 may include an organic or an inorganic polymer material, e.g., a polyimide, a polyamic acid, a polysiloxane, etc. The second alignment layer ALN2 initially aligns the liquid crystal molecules of the liquid crystal layer LC and includes a polymer material in which light, such as ultraviolet (UV) light or a laser, initiates a decomposition, dimerization, or isomerization reaction. In addition, the first alignment layer ALN1 may include a polymer polymerized with reactive mesogens.

In a present exemplary embodiment, the second base substrate BS2 includes a groove GRV, a trimming line TRL, and an alignment key pattern CKY.

The groove GRV is a pattern used to place the second alignment layer ALN2 in a predetermined area in the non-display area NDA of the second substrate SUB2. The groove GRV will be described in detail below.

The trimming line TRL is disposed between the floating electrode FLE and the common electrode CE in the non-display area NDA. The trimming line TRL separates the floating line FLE from the common electrode CE. The trimming line TRL may extend along the first direction D1 and/or the second direction DR2 to be substantially parallel with the gate lines GL or the data lines DL.

The alignment key pattern CKY is disposed in the non-display area NDA of the second base substrate BS2 and is used to prevent misalignment between the first substrate SUB1 and the second substrate SUB2 when the first and second substrates SUB1 and SUB2 are attached to each other. The alignment key pattern CKY is provided adjacent to the four corners of the second base substrate BS2. Although not shown in figures, an alignment key pattern is also provided on the first substrate SUB1 to correspond to the alignment key pattern CKY provided on the second base substrate BS2.

An exemplary display device according to a present exemplary embodiment includes the trimming line TRL and the floating electrode FLE, but is not limited thereto. For example, a portion of the non-display area in which the trimming line and the floating electrode are formed may be removed in a display device according to another exemplary embodiment.

The liquid crystal layer LC is disposed between the first alignment layer ALN1 and the second alignment layer ALN2. The liquid crystal molecules of the liquid crystal layer LC are vertically aligned to the first and second alignment layers ALN1 and ALN2 when there is no electric field between the pixel electrode PE and the common electrode CE.

The liquid crystal layer LC and the sealant part SLP are disposed between the first substrate SUB1 and the second substrate SUB2. The sealant part SLP seals the liquid crystal layer LC between the first substrate SUB1 and the second substrate SUB2. When viewed in a plan view, the sealant part SLP is provided along an end portion of the first substrate SUB1 to surround the liquid crystal layer LC and includes an organic polymer.

In a display device, when a gate signal is provided to the gate line GLn, the thin film transistor Tr is turned on. Accordingly, a data signal provided to the data line DLm is applied to the pixel electrode PE through the turned on thin film transistor Tr. When the data signal is applied to the pixel electrode PE through the turned-on thin film transistor Tr, an electric field is generated between the pixel electrode PE and the common electrode CE. The liquid crystal molecules of the liquid crystal layer LC are driven by the electric field generated between the common electrode CE and the pixel electrode PE. Thus, the transmittance of light passing through the liquid crystal layer LC is changed, and thus an image is displayed.

In a present exemplary embodiment, each pixel is connected to one gate line GLn and two data lines DLm and DLm+1, but this arrangement is non-limiting. For example, each pixel may be connected to two gate lines and one data line. In addition, in a present exemplary embodiment, each pixel includes two sub-pixel electrodes, but this number of the sub-pixel electrodes is also non-limiting. That is, each pixel may include three or more sub-pixel electrodes. The number of pixel electrodes may change depending on the design of each pixel. For example, each pixel may be divided into plural sub-pixels, and each sub-pixel may correspond to at least one sub-pixel electrode.

In addition, in a present exemplary embodiment, the pixel electrode includes plural branch portions and the common electrode is integrally formed as a single unitary and individual unit, but they should not be limited thereto. The pixel electrode and the common electrode may be patterned to have various shapes. Further, the pixel electrode and the common electrode may be formed on only one of the first and second substrates.

Figure 5:
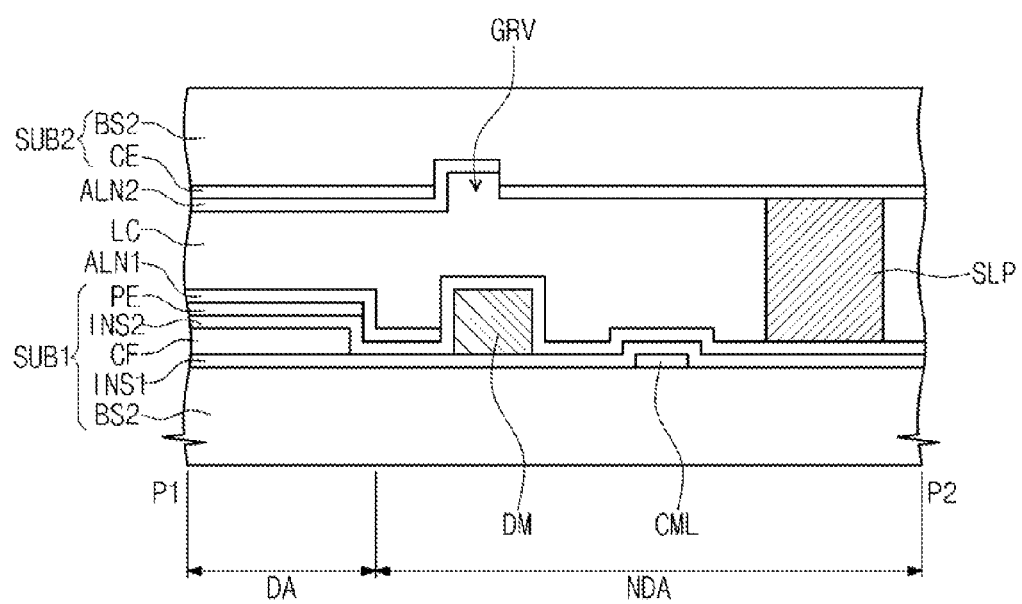
FIG. 5 is a cross-sectional view taken along a line P1-P2 of FIG. 1.

FIGS. 5 and 6 are cross-sectional views illustrating a groove according to a present exemplary embodiment. In detail, FIG. 5 is a cross-sectional view taken along a line P1-P2 of FIG. 1, and FIG. 6 is a cross-sectional view taken along a line P3-P4 of FIG. 1.

Referring to FIGS. 1 to 6, the groove GRV is provided in the second base substrate BS2. The groove GRV is used to form the alignment layer in a predetermined area. To this end, the groove GRV has a recessed shape.

In general, the alignment layer is formed by coating an alignment solution on a substrate and curing the alignment solution. Since the alignment solution is a fluid that has surface tension, the alignment solution may be overcoated, insufficiently coated, removed after being coated, or may seep into other areas according to the topology and properties of the substrate. To prevent the above-mentioned defects, a groove may be formed in an area adjacent to the end portion of the alignment layer, i.e., the contact portion between the upper surface of the alignment layer and the substrate.

The groove GRV has a predetermined width and depth. In a present exemplary embodiment, the groove GRV has a width of about 20 micrometers or more. In addition, the groove GRV is spaced apart from the end portion of the second alignment layer ALN2 by a distance of about 300 micrometers or more. When the groove GRV has a width less than about 20 micrometers or is spaced apart from the end portion of the second alignment layer ALN2 by a distance less than about 300 micrometers, the alignment solution for the second alignment layer ALN2 may overflow into the non-display area NDA. The depth of the groove GRV changes depending on the material and thickness of the second base substrate BS2. In a present exemplary embodiment, the groove GRV has a depth less than or equal to about 20 micrometers. When the depth of the groove GRV is greater than about 20 micrometers, the second base substrate BS2 may crack.

The groove GRV is disposed in at least a portion of the end portion of the second alignment layer ALN2. The groove GRV is provided along at least a portion of the display area DA. In a present exemplary embodiment, the groove GRV may be provided along a circumference of the display area DA. The display area DA has a rectangular shape, and thus the groove GRV extends along at least one side of the rectangular shape.

The groove GRV separates the end portion of the second alignment layer ALN2 from the sealant part SLP in the non-display area NDA of the second substrate SUB2. A plurality of grooves GRV may be provided. In this case, the grooves GRV are spaced apart from each other. As shown in FIG. 1, the groove GRV has a rectilinear shape along three sides of the display area DA and has a dotted-line shape along one side of the display area DA. Alternatively, the groove GRV may extend along the long sides or the short sides and may have a shape that differs from a rectilinear shape when viewed in a plan view. In a present exemplary embodiment, the common electrode CE is not provided in areas in which the groove GRV is disposed. Alternatively, according to other exemplary embodiments, the common electrode CE may be provided in the areas in which the groove GRV is disposed, and the common electrode CE may be divided into two or more portions according to the width and the depth of the groove GRV. Since the common electrode CE is applied with a common voltage through the contact part CP, the groove GRV is provided with a dotted-line shape to prevent the contact part CP from separating from the common electrode CE.

In a present exemplary embodiment, the sealant part SLP is spaced apart from the groove GRV. In this case, the alignment solution does not seep into the area in which the sealant part SLP is formed, thus improving the adhesive strength of the sealant part SLP with respect to the first and second substrates SUB1 and SUB2. Alternatively, according to other exemplary embodiments, the sealant part SLP may overlap the groove GRV when viewed in a plan view. The adhesive strength of the sealant part SLP may be maintained since the alignment layer is formed only in the predetermined area even though the sealant part SLP and the groove GRV partially overlap each other.

In addition, the first substrate SUB1 may further include a barrier dam DM to control a position of the alignment layer.

The barrier dam DM protrudes from the first substrate SUB1 so that the first alignment layer ALN1 is formed in a predetermined area on the first substrate SUB1.

The barrier dam DM is formed of the same material as the black matrix BM and is disposed on the same layer as the black matrix BM in the non-display area NDA. The barrier dam DM is disposed to correspond to the end portion of the first alignment layer ALN1. In a present exemplary embodiment, one barrier dam DM is provided on the first substrate SUB1, but other embodiments are not limited thereto. That is, a plurality of barrier dams DM may be provided, and the barrier dams DM may be spaced apart from each other.

In a present exemplary embodiment, the barrier dam DM partially overlaps the groove GRV when viewed in a plan view, but is not limited thereto. According to another exemplary embodiment, the barrier dam DM may be spaced apart from the groove GRV when viewed in a plan view.

The second alignment layer ALN2 covers the entire display area DA and a portion of the non-display area NDA and its end portion is located at a position corresponding to the barrier dam DM.

In a present exemplary embodiment, the sealant part SLP does not overlap the barrier dam DM. Alternatively, according to other exemplary embodiments, the sealant part SLP may overlap a portion of or the whole barrier dam DM. In this case, although the barrier dam DM overlaps a portion of the sealant part SLP, the sealant part SLP may maintain its adhesive strength since the alignment layer is restricted to the predetermined area.

In a display device having the above-mentioned structure, the alignment layer may be formed in desired position or area, and thus defects caused by misalignment of the alignment layer may be prevented. That is, the alignment solution may be prevented from overcoating, insufficiently coating, being removed after being coated, or seeping into other areas. In particular, reducing the area in which the alignment solution overlaps the sealant part may improve the adhesive strength of the sealant part. In addition, defects due to the display area being not fully covered due to the backdraft of the alignment solution may be prevented. Further, the alignment solution may be prevented from overcoating the contact part, preventing a contact defect between the common electrode and the common line. Further, the position of the alignment solution is easily determined, the width of the sealant part may be set to various values, and a material for the sealant part may be prevented from being overcoated, insufficiently coated, removed after being coated, or seeping into the other areas.

FIGS. 7A to 7D are plan views of various examples of grooves in area P5 of FIG. 1.

Figure 7A:
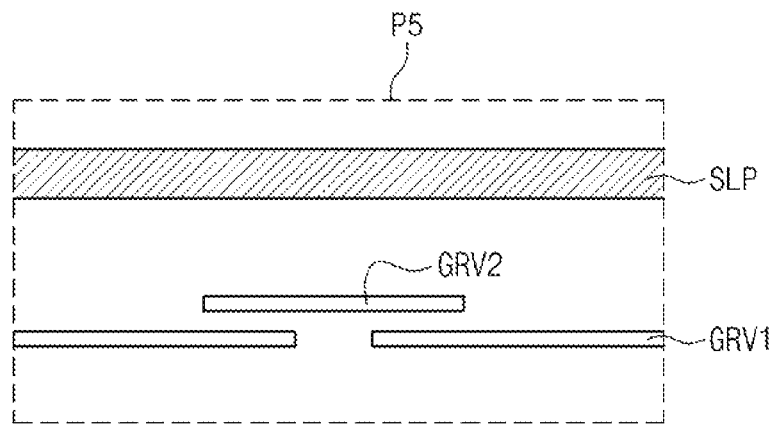
FIGS. 7A to 7D are plan views of various examples of groove in an area P5 of FIG. 1.

Referring to FIG. 7A, two groups of grooves GRV are provided in different sizes. The grooves GRV include first grooves GRV1 and second grooves GRV2. The first groove GRV1 extends in a direction parallel to the sealant part SLP. The second groove GRV2 is disposed in an area not having the first groove GRV1, overlaps with the first groove GRV1 when viewed in a plan view and prevents dispersion of the alignment solution into the area not having the first groove GRV1.

Figure 7B:
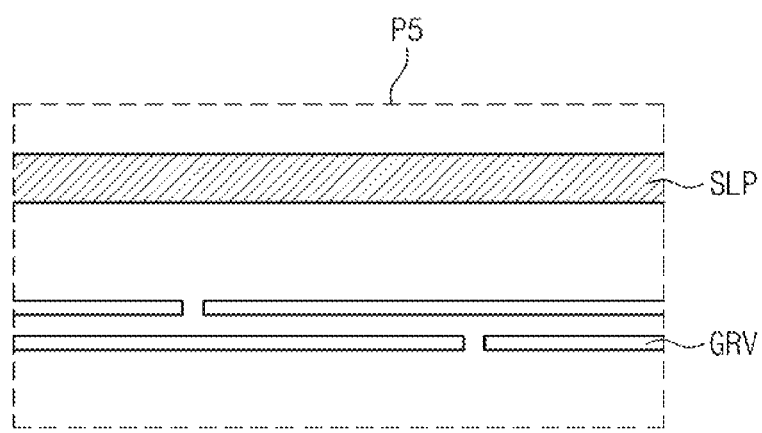

Referring to FIG. 7B, two groups of grooves GRV are provided that are spaced apart from each other and extend in the same direction. The grooves GRV overlap with each other when viewed in a plan view. Accordingly, although the alignment solution may flow over a groove GRV positioned at a first position, the dispersion of the alignment solution may be blocked by another groove GRV positioned at a second position. In FIG. 7B, two grooves GRV overlap each other when viewed in a plan view, but the number of overlapping grooves GRV is not limited to two. In this case, each groove GRV may open at a different position.

Figure 7C:
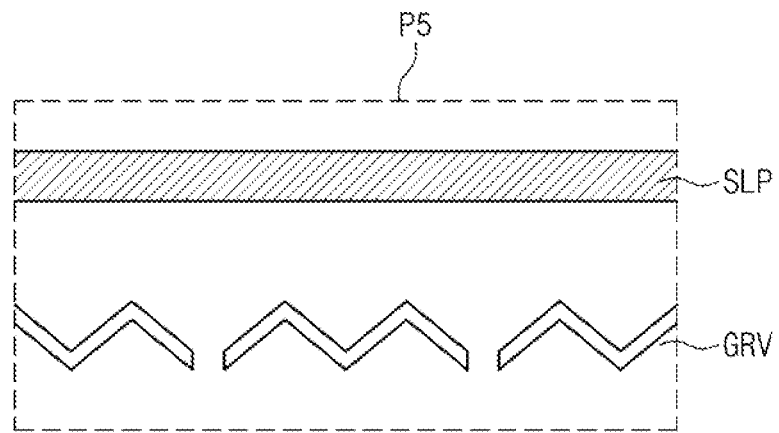
Figure 7D:
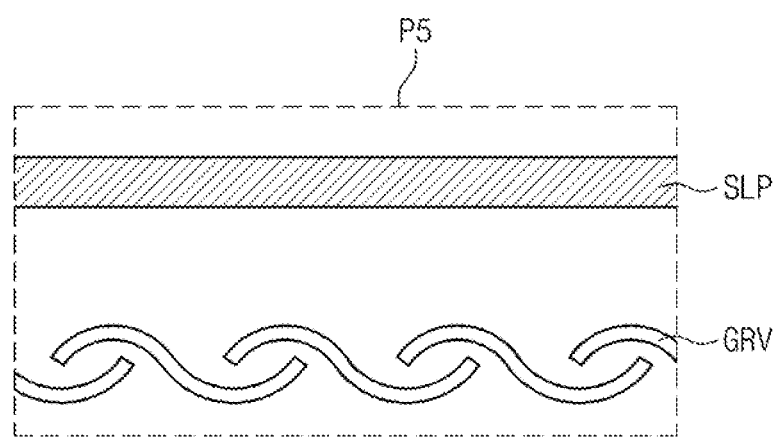

Referring to FIGS. 7C and 7D, a plurality of grooves GRV are provided that have various patterns, e.g., a zigzag pattern, a wave pattern, etc., when viewed in a plan view. The grooves GRV are disposed such that the common electrode between the groove GRV and the display area is electrically connected to the common electrode between groove GRV and the sealant part SLP.

Figure 8:
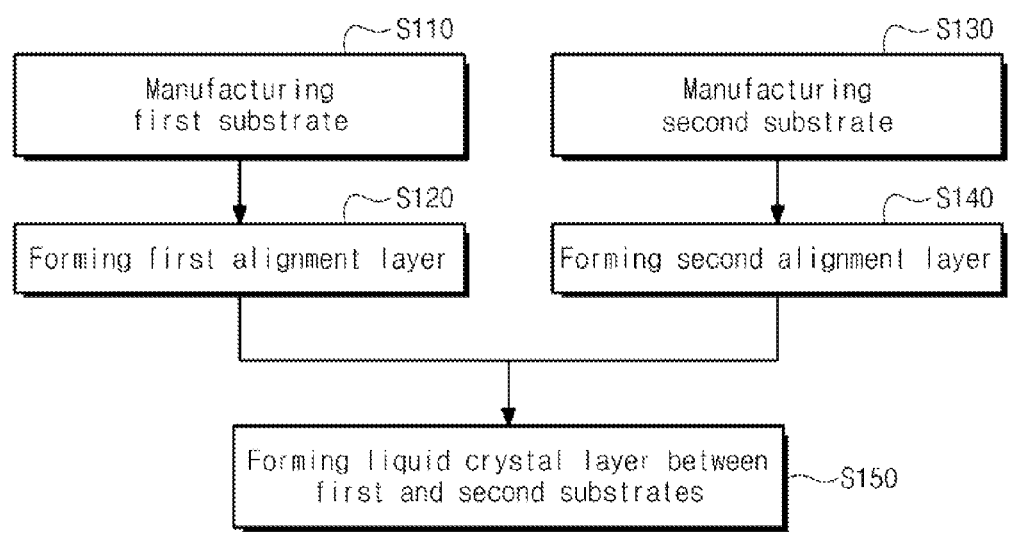
FIG. 8 is a flowchart of a method of manufacturing a display panel according to an exemplary embodiment of the present disclosure.

FIG. 8 is a flowchart of a method of manufacturing a display panel according to an exemplary embodiment of the present disclosure.

Referring to FIG. 8, a display device is manufactured by manufacturing the first substrate (S110), forming the first alignment layer on the first substrate (S120), manufacturing the second substrate having a groove in the non-display area (S130), forming the second alignment layer on the second substrate (S140), and forming the liquid crystal layer LC between the first substrate and the second substrate (S150).

The first substrate is manufactured by forming the line part, the thin film transistors, the color filters, the black matrix, and the pixel electrode on the first base substrate. In an embodiment of the present disclosure, the barrier dam may be formed together with the black matrix by a photolithography process using the same mask. Since the black matrix and the barrier dam have different heights on the first base substrate, a diffraction mask or a halftone mask may be used as the mask. Thus, when the first alignment layer is formed, the position of the end portion of the first alignment layer is determined by the barrier dam. As described above, the groove is formed in the non-display area of the second substrate. When the second alignment layer is faulted, the position of the end portion of the second alignment layer is determined by the groove.

The liquid crystal layer is formed between the first substrate and the second substrate by forming the sealant part on the first substrate or the second substrate, injecting liquid crystal in the area surrounding by the sealant part, and coupling the first substrate and the second substrate.

Meanwhile, before the second alignment layer is formed on the second substrate, the spacer is formed on the first substrate to maintain the distance between the first substrate and the second substrate. The spacer may be formed together with the black matrix by the same photolithograph process using the same mask.

In addition, according to another exemplary embodiment, the liquid crystal layer may include reactive mesogens. In this case, a process of irradiating ultraviolet light onto the liquid crystal layer is further performed after the liquid crystal layer is injected between the first and second substrates.

After coupling the first and second substrates to each other, the non-display area having the trimming line and the alignment key pattern CKY is removed by a cutting process.

Figure 9A:
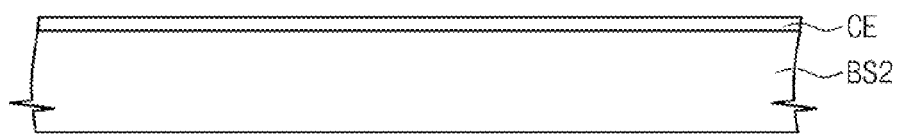
FIGS. 9A to 9C are cross-sectional views of processes of forming a second substrate and a second alignment layer according to an exemplary embodiment of the present disclosure.
Figure 9B:
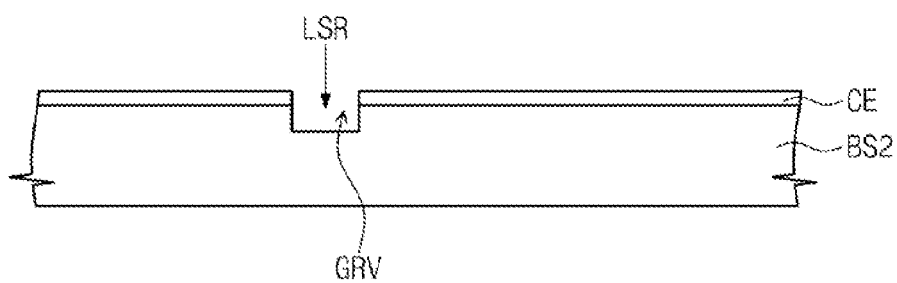
Figure 9C:
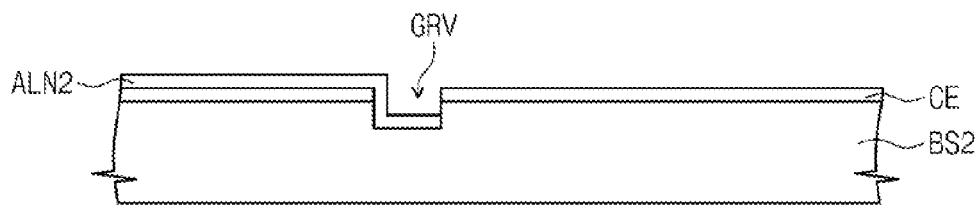

FIGS. 9A to 9C are cross-sectional views of processes of forming the second substrate and the second alignment layer according to an exemplary embodiment of the present disclosure. In FIGS. 9A to 9C, for the convenience of explanation, the first substrate, the first alignment layer, and the liquid crystal layer are omitted.

Referring to FIG. 9A, the second base substrate BS2 is prepared and the common electrode CE is formed on the second base substrate BS2. The common electrode CE is formed of a transparent conductive material, such as indium tin oxide (ITO), indium zinc oxide (IZO), etc.

Referring to FIG. 9B, a laser beam LSR is irradiated onto the common electrode CE on the second base substrate BS2 to form the groove GRV. The laser beam LSR may be any laser beam LSR capable of removing a portion of the second base substrate BS2 and the common electrode CE. In an embodiment of the present disclosure, the width and the depth of the groove GRV may be controlled by controlling an energy intensity of the laser beam LSR, a focusing depth of the laser beam LSR, and the duration of laser beam LSR irradiation.

In this case, the trimming line TRL and the alignment key pattern CKY of the non-display area may be formed by the laser beam while the groove GRV is formed. Therefore, the groove GRV, the trimming line TRL, and the alignment key pattern CKY are formed in a single process step using a laser beam, and thus separate photolithography processes may be omitted.

Referring to FIG. 9C, the alignment solution is coated on the second base substrate BS2 on which the groove GRV is formed, to form the second alignment layer ALN2. The boundary of the alignment solution is determined by the groove GRV. That is, a portion of the alignment solution fills into the groove GRV and is collected in the groove GRV, which prevents the alignment solution from being dispersed into other areas.

As described above, since the end portion of the second alignment layer ALN2 is disposed at the groove GRV, defects related to the second alignment layer ALN2 may be prevented. In addition, the groove GRV serves as a barrier for the second alignment layer ALN2 and for the sealant part SLP. That is, when the sealant part SLP is formed, the groove GRV may prevent a material for the sealant part SLP from seeping into the display area.

Figure 10A:
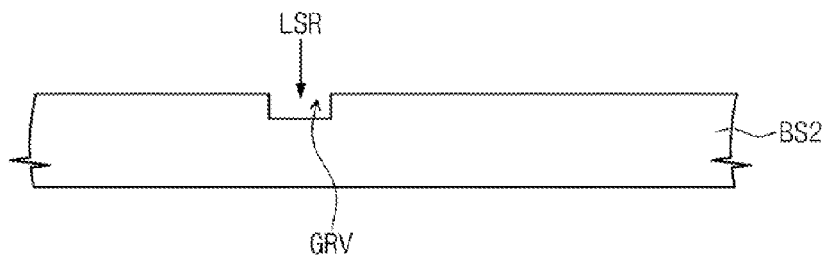
FIGS. 10A to 10C are cross-sectional views of processes of forming a second substrate and a second alignment layer according to another exemplary embodiment of the present disclosure.
Figure 10B:
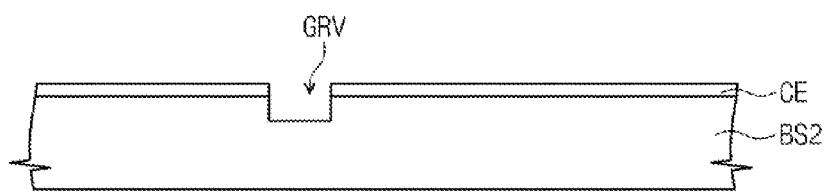
Figure 10C:
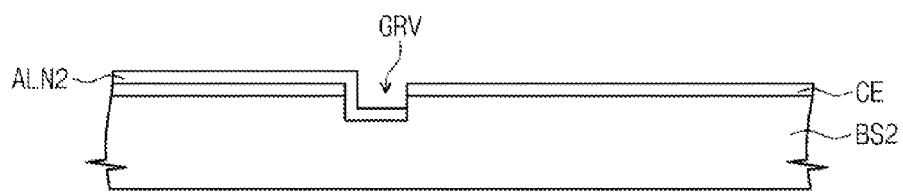

FIGS. 10A to 10C are cross-sectional views of processes of forming a second substrate and a second alignment layer according to another exemplary embodiment of the present disclosure. For the convenience of explanation, the first substrate, the first alignment layer, and the liquid crystal layer are omitted in FIGS. 10A to 10C.

Referring to FIG. 10A, the second base substrate BS2 is prepared and a laser beam LSR is irradiated onto the second base substrate BS2 to form the groove GRV. The laser beam LSR may be any laser beam LSR capable of removing a portion of the second base substrate BS2. In an embodiment of the present disclosure, the width and the depth of the groove GRV may be controlled by controlling an energy intensity of the laser beam LSR, a focusing depth of the laser beam LSR, and the duration of the laser beam LSR irradiation. The trimming line and the alignment key pattern of the non-display area may be removed using the laser beam when the groove GRV is formed.

Referring to FIG. 10B, the common electrode CE is formed on the second base substrate BS2 in which the groove GRV is formed.

Referring to FIG. 10C, the alignment solution is coated on the second base substrate BS2 to form the second alignment layer ALN2, in which the groove GRV and the common electrode CE are formed.

Figure 11A:
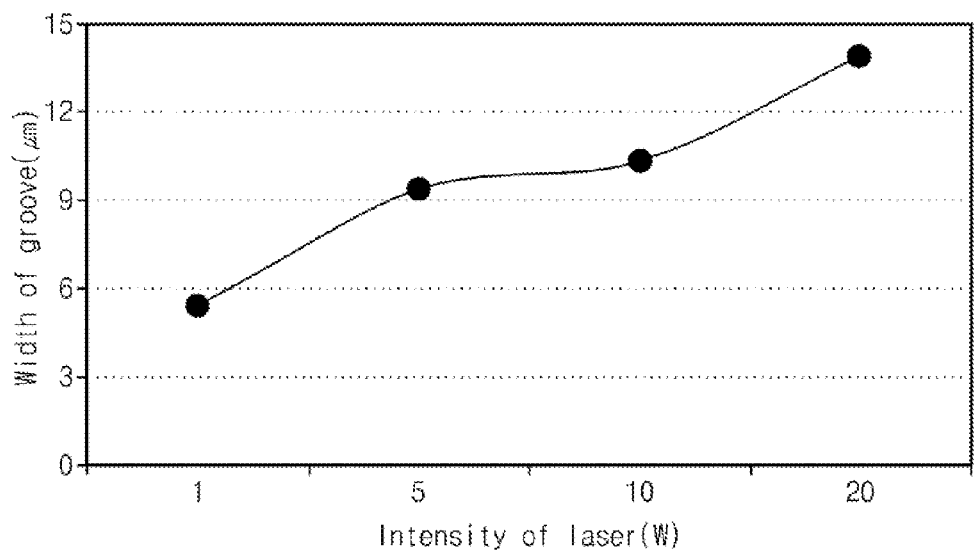
FIGS. 11A and 11B are graphs respectively of the width and depth of the groove as a function of an energy intensity of a laser beam according to an exemplary embodiment of the present disclosure.
Figure 11B:
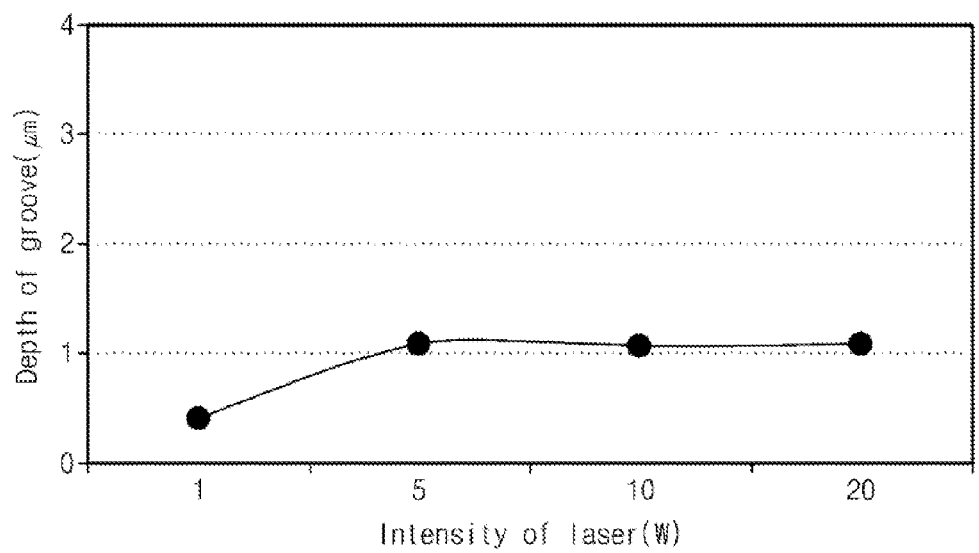

FIGS. 11A and 11B are graphs respectively of the width and depth of the groove as a function of an energy intensity of a laser beam according to an exemplary embodiment of the present disclosure. In an embodiment of the disclosure, the groove is formed in the second base substrate and the second base substrate is formed of a glass. As shown in FIGS. 11A and 11B, when the energy intensity of the laser beam increases, the width and depth of the groove GRV change.

Accordingly, the width and depth of the groove may be controlled by adjusting the energy intensity or the focusing depth of the laser beam.

Figure 12:
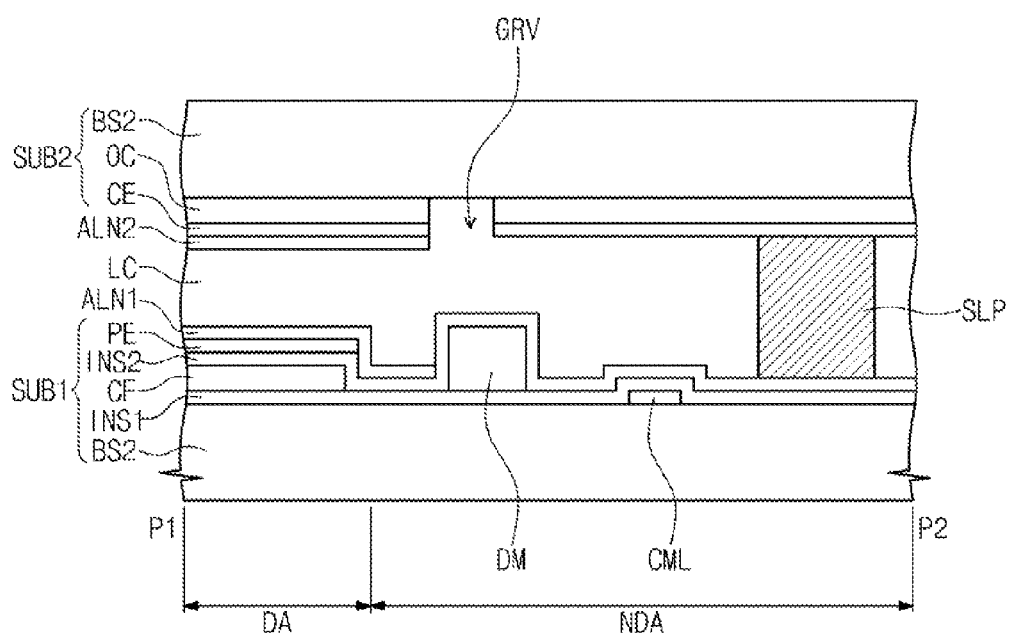
FIG. 12 is a cross-sectional view of a display panel according to another exemplary embodiment of the present disclosure, which is taken along the lint P1-P2 of FIG. 1.

FIG. 12 is a cross-sectional view of a display panel according to another exemplary embodiment of the present disclosure taken along the line P1-P2 of FIG. 1, and FIG. 13 is a cross-sectional view of a display panel according to another exemplary embodiment of the present disclosure taken along the line P3-P4 of FIG. 1.

Referring to FIGS. 12 and 13, the second substrate SUB2 may further include an overcoat layer OC between the second base substrate BS2 and the common electrode CE. The overcoat layer OC is disposed on the second base substrate BS2 and includes an organic or inorganic insulating material.

According to another exemplary embodiment, the groove GRV is formed by removing a portion of the overcoat layer OC and a portion of the common electrode CE. In the present embodiment, since the groove GRV is formed to penetrate through the overcoat layer OC and the common electrode CE, a portion of the second base substrate BS2 is exposed through the groove GRV.

According to another exemplary embodiment, the second substrate SUB2 may be manufactured by sequentially forming the overcoat layer OC and the common electrode CE on the second base substrate BS2 and removing a portion of the overcoat layer OC and the common electrode CE using the laser beam. Alternatively, the second substrate SUB2 may be manufactured by forming the overcoat layer OC on the second base substrate BS2, removing a portion of the overcoat layer OC using the laser beam, and forming the common electrode CE on the overcoat layer OC.

Figure 14A:
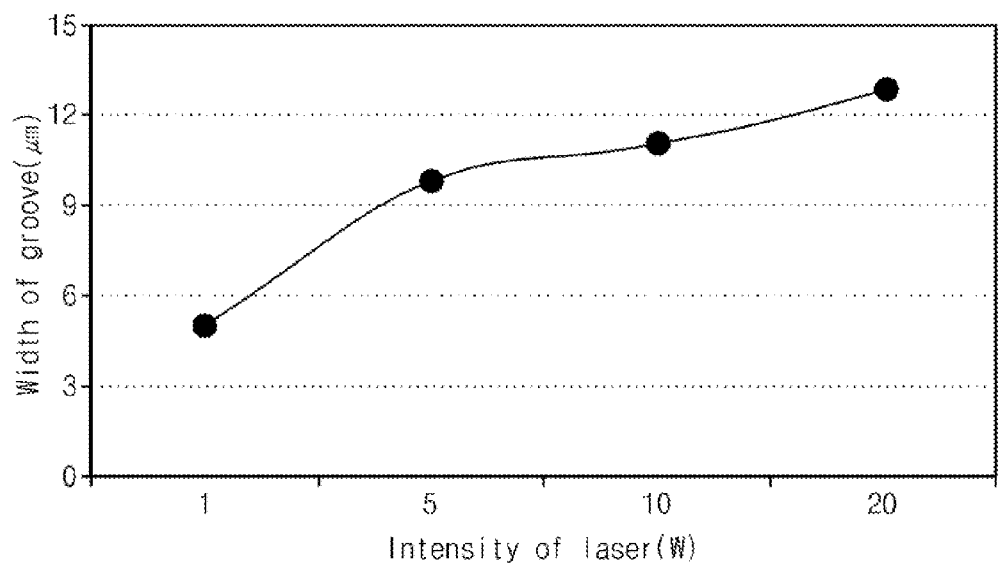
FIGS. 14A and 14B are graphs respectively of the width and depth of the groove as a function of an energy intensity of a laser beam according to an exemplary embodiment of the present disclosure.
Figure 14B:
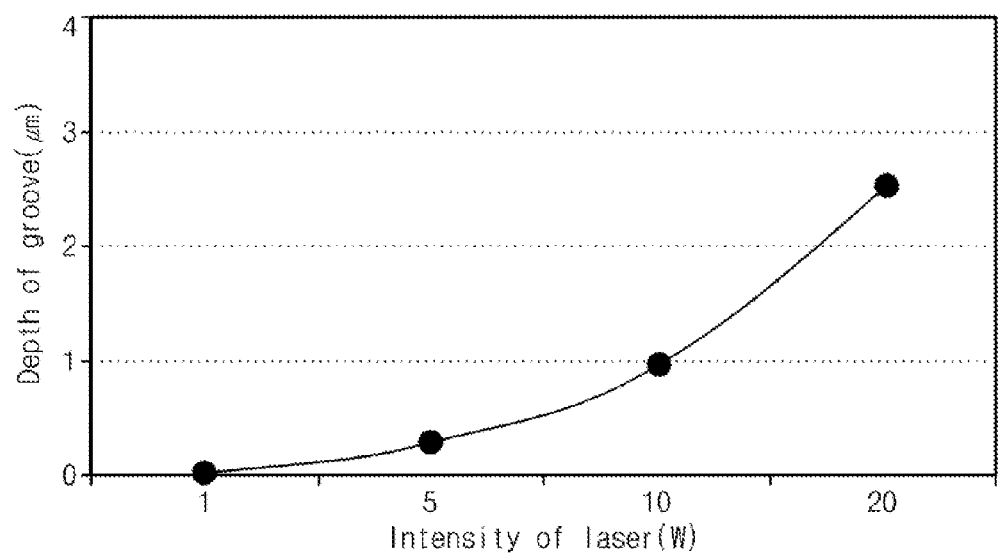

FIGS. 14A and 14B are graphs respectively of the width and depth of the groove as a function of an energy intensity of a laser beam according to an exemplary embodiment of the present disclosure. The groove is formed in the overcoat layer. As shown in FIGS. 14A and 14B, when the energy intensity of the laser beam increases, the width and depth of the groove changes. Accordingly, the width and depth of the groove may be controlled by adjusting the energy intensity or focusing depth of the laser beam.

Although exemplary embodiments of the present disclosure have been described, it is understood that embodiments of the present disclosure should not be limited to these exemplary embodiments but that various changes and modifications can be made by one ordinary skilled in the art within the spirit and scope of the present disclosure as hereinafter claimed.

What is claimed is:

1. A display device comprising a display area and a non-display area, comprising:
    a first alignment layer disposed on a first substrate;
    a second alignment layer disposed on a second substrate;
    a liquid crystal layer disposed between the first alignment layer and the second alignment layer;
    a sealant part disposed between the first substrate and the second substrate to seal the liquid crystal layer; and
    a groove disposed in the non-display area of the second substrate to correspond to at least a portion of an end portion of the second alignment layer,
    wherein the groove separates the end portion of the second alignment layer from the sealant part in the non-display area of the second substrate, and
    wherein the groove is disposed along a circumference of the display area, and the groove is open to correspond to at least one side of the display area in a plan view.

2. The display device of claim 1, wherein the first substrate includes a first base substrate, a common line on the first base substrate and a pixel electrode disposed on the first base substrate, and the second substrate includes a second base substrate and a common electrode disposed on the second base substrate to be electrically connected to the common line through a contact part, wherein the groove is disposed in the second base substrate.

3. The display device of claim 2, further comprising an overcoat layer disposed between the second base substrate and the common electrode, wherein the groove is disposed in the overcoat layer.

4. The display device of claim 2, wherein at least a portion of the groove adjacent to the contact art has a dotted-line shape in a plan view.

5. The display device of claim 1, wherein a plurality of spaced apart grooves are provided.

6. The display device of claim 1, wherein at least a portion of the grooves has a zigzag shape when viewed in a plan view.

7. The display device of claim 1, wherein at least a portion of the grooves has a curved shape when viewed in a plan view.

8. The display device of claim 5, wherein two groups of grooves are provided in that are spaced apart from each other in a plan view.

9. The display device of claim 1, wherein the groove has a width equal to or greater than about 20 micrometers.

10. The display device of claim 1, wherein the groove is spaced apart from the end portion of the second alignment layer by a distance equal to or greater than about 300 micrometers.

11. The display device of claim 2, further comprising:
a barrier dam disposed in the non-display area of the first substrate that protrudes from the first substrate in an area corresponding to an end portion of the first alignment layer;
color filters disposed between the first base substrate and the pixel electrode; and
a black matrix disposed on the first substrate between the color filters, wherein the barrier dam is formed of the same material as the black matrix.

12. A method of manufacturing a display device that comprises a display area that displays an image and a non-display area disposed adjacent to at least a side of the display area, the method comprising:
forming a first alignment layer on a first substrate;
manufacturing a second substrate facing the first substrate, the second substrate including a common electrode and a groove disposed in the non-display area, wherein the groove is formed using a laser beam; and
forming a second alignment layer on the second substrate and forming a liquid crystal layer between the first substrate and the second substrate,
wherein the groove forms a barrier disposed along a circumstance of the display area to separate an end portion of the second alignment layer from a sealant part that is disposed between the first substrate and the second substrate to seal the liquid crystal layer, and
wherein the groove is open to correspond to at least one side of the display area in a plan view.

13. The method of claim 12, wherein manufacturing the second substrate comprises:
preparing a second base substrate;
forming the common electrode on the second base substrate; and
irradiating the laser beam into the common electrode and the second base substrate to form the groove.

14. The method of claim 12, wherein manufacturing the second substrate comprises:
preparing a second base substrate;
irradiating the laser beam into the second base substrate to form the groove; and
forming the common electrode on the second base substrate.

15. The method of claim 12, wherein manufacturing the second substrate comprises:
preparing the second base substrate;
forming an overcoat layer on the second base substrate;
forming the common electrode on the second base substrate; and
irradiating the laser beam into the common electrode and the overcoat layer to form the groove.

16. The method of claim 12, wherein manufacturing of second substrate comprises:
preparing a second base substrate;
forming an overcoat layer on the second base substrate;
irradiating the laser beam into the overcoat layer to form the groove; and
forming the common electrode on the overcoat layer.

17. The method of claim 12, wherein at least one of a width or a depth of the groove is controlled by at least one of an energy intensity or a focusing depth of the laser beam.

18. The method of claim 12, further comprising forming a trimming line and an alignment key pattern in the non-display area of the second substrate using the laser beam, wherein the alignment key pattern is configured to align the first substrate and the second substrate, and the trimming line separates a floating electrode from the common electrode.

19. The method of claim 18, wherein the alignment key pattern, the trimming line, and the groove are formed in a single process step.

20. The method of claim 19, further comprising removing the trimming line and the alignment key pattern using the laser beam when the groove is formed.

21. A display device, comprising:
a display area and a non-display area;
a first alignment layer disposed on a first substrate;
a second alignment layer disposed on a second substrate;
a liquid crystal layer disposed between the first alignment layer and the second alignment layer;
a sealant part disposed between the first substrate and the second substrate to seal the liquid crystal layer;
a groove disposed in the non-display area of the second substrate to correspond to at least a portion of an end portion of the second alignment layer; and
a barrier dam disposed in the non-display area of the first substrate that protrudes from the first substrate in an area corresponding to an end portion of the first alignment layer,
wherein the groove separates the end portion of the second alignment layer from the sealant part in the non-display area of the second substrate, and
wherein the groove is open to correspond to at least one side of the display area in a plan view.

22. The display device of claim 21, wherein the second substrate further comprises:
a common electrode;
a trimming line disposed in the non-display area thereof that separates a floating electrode from the common electrode; and
an alignment key pattern disposed in the non-display area thereof,
wherein the alignment key pattern is configured to prevent misalignment between the first substrate and the second substrate when the first substrate and the second substrate are attached to each other.

23. The display device of claim 1, wherein the first substrate comprises a first base substrate, a common line on the first base substrate and a pixel electrode disposed on the first base substrate, the second substrate comprises a second base substrate and a common electrode disposed on the second base substrate to be electrically connected to the common line through a contact part, the groove is disposed in the second base substrate, and at least a portion of the groove adjacent to the contact part is open.

* * * * *